United States Patent [19]

Lindstrom

[11] Patent Number: 4,647,359

[45] Date of Patent: Mar. 3, 1987

[54] ELECTROCATALYTIC GAS DIFFUSION ELECTRODE EMPLOYING THIN CARBON CLOTH LAYER

[75] Inventor: Robert W. Lindstrom, Reading, Mass.

[73] Assignee: Prototech Company, Newton Highlands, Mass.

[21] Appl. No.: 787,920

[22] Filed: Oct. 16, 1985

[51] Int. Cl.$^4$ .................. C25B 11/12; B32B 31/12; H01M 4/86

[52] U.S. Cl. .................. 204/294; 156/280; 156/292; 156/298; 429/42

[58] Field of Search .................. 204/98, 128, 294; 156/280, 292, 298; 429/42

[56] References Cited

U.S. PATENT DOCUMENTS

| | | | |
|---|---|---|---|
| 3,726,738 | 4/1973 | Gellon et al. | 204/294 |
| 3,829,327 | 8/1974 | Omori et al. | 204/294 |
| 4,265,727 | 5/1981 | Beckley | 204/294 |
| 4,278,525 | 7/1981 | Gestaut | 204/294 |
| 4,317,867 | 3/1982 | Warszawski | 429/42 |
| 4,330,387 | 5/1982 | Astruc et al. | 204/294 |
| 4,349,428 | 9/1982 | Lu et al. | 204/294 |
| 4,354,958 | 10/1982 | Solomon | 204/294 |
| 4,357,262 | 11/1982 | Solomon | 204/294 |
| 4,360,417 | 11/1982 | Reger et al. | 204/294 |
| 4,379,772 | 4/1983 | Solomon et al. | 204/294 |
| 4,414,092 | 11/1983 | Lu et al. | 204/294 |
| 4,560,443 | 12/1985 | Foller | 429/42 |
| 4,564,427 | 1/1986 | Gruver et al. | 204/294 |

FOREIGN PATENT DOCUMENTS

1147853  4/1969  United Kingdom ................ 204/294

*Primary Examiner*—Terryence Chapman
*Attorney, Agent, or Firm*—Rines and Rines, Shapiro and Shapiro

[57] ABSTRACT

An improved electrocatalytic gas diffusion electrode comprising an open pore carbon cloth carrying on one side a first uniform mixture of noble-metal-catalyzed carbon and a hydrophobic binder adhered within the cloth pores and to the yarns of the cloth to a depth less than the thickness of the cloth, and a second uniform mixture of non-catalytic carbon and a hydrophobic binder adhered to the remaining open pore portion on the other side of said cloth; and method of preparation.

12 Claims, No Drawings

ELECTROCATALYTIC GAS DIFFUSION ELECTRODE EMPLOYING THIN CARBON CLOTH LAYER

The present invention relates to improved electrocatalytic gas diffusion electrodes and to processes or methods for making and using the same, being more particularly directed to improvements in the type of thin carbon cloth-based electrodes that are useful to electrochemical cells, as in hydrogen or other ionizable fuel anodes and air or oxygen or other ionizable oxidant cathodes, and in a variety of acid, alkaline and other electrolyte-containing electrochemical cells including, in addition to fuel cells, electrochemical cells for metal electrowinning, caustic chlorine cells, metal air batteries, and other systems employing such diffusion electrodes. Electrodes of this type are described, for example, in prior U.S. Pat. Nos. 4,293,396 and 4,248,682.

There are occasions when thin carbon cloth-based electrocatalytic gas diffusion electrodes of the type described in said Letters Patent require improved operation, particularly under circumstances such as those encountered in air or oxygen cathodes in phosphoric acid and similar fuel cells. Here I have found it advantageous to increase the platinum content of the portion of the electrode facing the electrolyte (herein called "the electrolyte side" of the electrode) at the expense of the portion of the electrode facing the gas, e.g. air or oxygen, (herein called "the gas side" of the electrode). While I do not want to be held to any particular theory, the "gas side" platinum appears to be relatively ineffective because of, perhaps, a poor 3-phase contact (Pt-$O_2$-electrolyte).

There are similar situations in connection with hydrogen or other ionizable fuel anode electrodes where such improvement is also desireable; and it is to improved techniques and electrode structures for addressing these ends that the invention is primarily directed.

An object of the invention, therefore, is to provide a new and improved electrocatalytic gas diffusion electrode comprising an open pore carbon cloth of the type described, and improved methods for making the same, that enables the active agent, the catalytic carbon, to be provided at the electrolyte side of the electrode and thereby effectively narrowing the active zone of reaction of, for example, the oxidant and catalyzed carbon and electrolyte.

A further object is to provide an improved gas diffusion electrode having a catalytic surface and adapted for more general use as well.

Other and further objects will be explained hereinafter and are more particularly pointed out in the appended claims.

In summary, from one of its view points, the invention embraces a novel electrocatalytic gas diffusion electrode comprising an open pore carbon cloth carrying on one side a first uniform mixture of noble metal catalyzed carbon and a hydrophobic binder adhered within the cloth pores into the yarns of the cloth but to a depth less than the cloth, and a second uniform mixture of non-catalytic carbon in a hydrophobic binder adhered to the remaining open pore portion on the other side of said cloth. Preferred method and structure of details are hereinafter set forth, including best mode embodiments.

The invention will now be described without reference to a drawing, because it is considered sufficiently understandable, particularly in light of the prior art provided by said Letters Patent, without the necessity of illustration.

The novel electrode of the invention comprises the same type of open pore carbon cloth described in the said Letters Patent, such as, for example, Stackpole PWB-3 carbon cloth (15 mils thick, of about 25-50 yarns/in). Generally, however, here I prefer cloth thicknesses of 10 to 50 mils to accommodate the two layers. In said prior Letters Patent, catalytic carbon particles, such as Vulcan XC-72 or the other types described in said Letters Patent, are provided with Pt or other noble metal catalyst coatings, as by the methods described in said Letters Patent and other well known methods, and are mixed within a hydrophobic binder which was applied to the carbon cloth uniformly over the surface thereof and uniformly through and within the pores of the cloth and through which and to the yarns of which the combined mixture of catalytic carbon particles and hydrophobic binder were evenly adhered. As before stated, in accordance with the present invention for the particular purposes above described and other similar purposes, this mixture of the noble metal catalyzed carbon and the hydrophobic binder, as of, for example, Teflon (polymeric flourinated hydrocarbon) or the like, is adhered to one side of the carbon cloth and within the pores and to the yarns, but is deliberately restricted to extend only partially into the thickness of the cloth. In accordance with the present invention, a second uniform mixture, this time of non-catalytic carbon, such as the same Vulcan XC-72 or similar particles, again mixed in a hydrophobic binder, as of Teflon or the like, is adhered on the other side of the cloth into the remaining open pore portion in the yarns of the cloth. Preferably, the two mixtures applied and adhered to the opposite sides of the cloth together substantially fill the thickness of the cloth and electrical conductive contact between the catalyzed and non-catalyzed carbon mixtures is established by and within the interior of the cloth.

To aid in improving such conductive contact of the mixtures within the cloth, it may be desireable in some instances to insert into the interior of the cloth conductive carbon particles as an interior layer. The carbon powder may be applied to the interior of the cloth after one side has been coated or had applied to it its electrocatalyst or non-catalyzed carbon layers.

The first uniform mixture of the noble metal catalyzed carbon and its hydrophobic binder may be applied to the surface and into the pores; or, alternatively, one or both of the mixtures may be preformed as a sheet and press fitted and then thus adhered against the respective sides of the cloth with penetration into the cloth. Suitable techniques for forming such sheets are described, for example, in U.S. Pat. No. 3,493,006.

As discussed in the first named patents of the common assignee, the preferred catalyst, particularly for the phosphoric acid fuel cell and similar applications, is platinum and preferably of optimum initial particle size in the range of from about 15-25 A as described in U.S. Pat. No. 4,044,193. Clearly other catalyzing noble metal particles may also be used.

Successful gas diffusion electrodes of this character have been constructed and tested in a phosphoric acid fuel cell of the type described in said Letters Patent with 20-30 mv better performance at about 200 milliamps per square centimeter at atmospheric pressure and about 190° C. In this application, the operation of the invention was as an oxygen (air) cathode, about 1"×1" active area, wherein the catalyzed carbon hydrophobic layer on the electrolyte side had its electrocatalyst surface protruding somewhat of the order of 0.001 of an inch or so on the electrolyte side of the thin carbon cloth, and wherein the cathode contained a similarly protruding thin layer of non-catalyzed hydrophobic carbon-Teflon layer on its opposite (gas) side. These layers, of course, fill the interstices of the yarn and are adhered thereto during the spreading of the mixtures on each side. It has also been found that when the hydrophobic binder and the carbon particles (either catalyzed and/or non-catalyzed) are preformed as an extruded sheet, for example, that a somewhat thicker layer is provided on each of the surfaces, still, of course, penetrating into the yarn and pores and adhering to the same within the cloth.

Another technique for improving conductive contact between the opposing layers and/or providing a further most advantageous feature of rigidizing or stiffening the cloth to resist flexure in response to gas and/or liquid flow over the electrode (a decided problem with carbon paper and flexible carbon matte or cloth electrodes), resides in carbonizing the carbon cloth fiber yarn by coating the same with a phenolic resin or the like and reducing the same to a stiffening carbon coating on the yarn at high temperature in an inert atmosphere. The present invention is concerned with synergistically combining this rigidizing carbonizing with hydrophobic binder-electrocatalyst and/or hydrophobic binder noncatalyzed carbon layers on the faces of the rigidized cloth to constitute an electrode assembly that simultaneously enables both resistance to flexure of the electrode under the forces of gas or liquid flow in the electrochemical cells, and also can provide the improved contact within the electrode. As an example, thusly stiffened carbon cloth carrying opposing electrocatalyst and non-catalytic carbon layers as before described has displayed, in pieces three inches square in size, a substantially imperceptable flexure deflection under gravitational forces acting on the piece when held by an edge, as compared with the limpness of the non-rigidized cloth electrode with said layers. Intermediate degrees of stiffening may also be produced.

Other and further objects will occur to those skilled in this art and are considered to fall within the spirit and scope of the invention as defined in the appended claims.

I claim:

1. A method of preparing an electrocatalytic gas diffusion electrode with an open pore carbon cloth, comprising the steps of depositing a first uniform mixture of noble-metal-catalyzed carbon and a hydrophobic binder on one side of said cloth and adhering said first mixture within the cloth pores and to the yarns of the cloth to a depth less than the thickness of the cloth, and similarly depositing a second uniform mixture of non-catalytic carbon and a hydrophobic binder to the remaining open pore portion on the other side of said cloth and adhering said second mixture within the cloth pores and to the yarns of the cloth to a depth less than the thickness of the cloth.

2. The method of claim 1 wherein said mixtures together substantially fill the thickness of said cloth.

3. The method of claim 1 wherein conducting carbon is inserted into the interior of the cloth between said two mixtures to provide improved conductive contact of the mixtures within the cloth.

4. The method of claim 1 and in which said depositing steps comprise preforming a sheet of one or both of the catalyzed and non-catalytic carbons in the hydrophobic binder and press-fitting the same against the respective sides of the cloth.

5. The method of claim 4 and in which conducting carbon is inserted into the interior of the cloth between said sheets to improve conductive contact of the same within the cloth.

6. An electrocatalytic gas diffusion electrode comprising an open pore carbon cloth carrying on one side a first uniform mixture of noble-metal-catalyzed carbon and a hydrophobic binder adhered within the cloth pores and to the yarns of the cloth to a depth less than the thickness of the cloth, and carrying on the other side of said cloth a second uniform mixture of non-catalytic carbon and a hydrophobic binder adhered within the cloth pores and to the yarns of the cloth to a depth less than the thickness of the cloth.

7. An electrode as claimed in claim 6 wherein said mixtures together substantially fill the thickness of said cloth.

8. An electrode as claimed in claim 6 wherein conducting carbon is inserted into the interior of the cloth between said two mixtures to provide improved conductive contact of the mixtures within the cloth.

9. An electrode as claimed in claim 6 and in which said adhered mixtures comprise preformed sheets of one or both of the catalyzed and non-catalytic carbons in the hydrophobic binder press-fitted against the respective sides of the cloth.

10. An electrode as claimed in claim 9 and in which conducting carbon is inserted into the interior of the cloth to provide improved conductive contact of the sheets within the cloth.

11. A method of preparing an electrocatalytic gas diffusion electrode with an open pore carbon cloth, comprising the steps of rigidizing said cloth by forming a carbonizing coating on the yarns thereof, depositing a first uniform mixture of noblemetal-catalyzed carbon and a hydrophobic binder on one side of the rigidized carbonized cloth and adhering said first mixture within the cloth pores and to the carbonized yarns of the cloth to a depth less than the thickness of the cloth, and similarly depositing a second uniform mixture of non-catalytic carbon and a hydrophobic binder to the remaining open pore portion on the other side of said rigidized carbonized cloth and adhering said second mixture within the cloth pores and to the yarns of the cloth to a depth less than the thickness of the cloth.

12. An electrocatalytic gas diffusion electrode comprising an open pore carbon cloth the yarns of which are coated with a rigidizing carbonized coating and carrying on one side a first uniform mixture of noble-metal-catalyzed carbon and a hydrophobic binder adhered within the cloth pores and to the rigidized carbonized yarns of the cloth to a depth less than the thickness of the cloth, and carrying on the other side of said cloth a second uniform mixture of non-catalytic carbon and a hydrophobic binder adhered within the cloth pores and to the yarns of the cloth to a depth less than the thickness of the cloth.

* * * * *